United States Patent Office

2,819,987
Patented Jan. 14, 1958

2,819,987

FRICTION MATERIAL

Theodore Maierson, Dayton, Robert A. Todd, Trotwood, and Harold W. Schultz, Dayton, Ohio, assignors to General Motors Corporation, Detroit, Mich., a corporation of Delaware No Drawing. Application May 3, 1956
Serial No. 582,318

5 Claims. (Cl. 117—140)

This invention relates to friction facings and is particularly concerned with non-metallic friction facings used in connection with wet clutches and the like.

It is the main object of the invention to provide a new type of resin reinforced fibrous facing in sheet form for use in connection with wet clutches and the like wherein the facing is of a porous nature and provides good frictional characteristics with high resistance toward wear.

In carrying out the above object, it is a further object of the invention to provide a fibrous facing composition for use in wet clutches and the like which comprises a major portion of cotton linters, together with leather dust, asbestos, fuller's earth and iron oxide wherein the ingredients are sheeted to form a paper-like layer which is subsequently impregnated with a phenolic composition in controlled quantities to provide a porous material.

Further objects and advantages of the present invention will be apparent from the following description, reference being had to the description which follows.

Wet clutch applications are becoming increasingly important in view of automatic transmissions used in connection with motor vehicles. These transmissions generally include a plurality of clutch plates operating in a fluid medium which plates are used as in a torque transmitting device. Automatic transmissions are well konwn in the art and one of such transmissions is described in Thompson Patent 2,357,295. Clutch plates for use in transmissions of this general character are described in Almen and Carnegie Patents 2,733,797 and 2,733,798, wherein the plates are formed from a paper-like material impregnated in a controlled manner with a phenolic resin and are bonded to the surface of steel clutch plates wherein the friction facing may be used alone or in combination with other friction material such as cork.

The present invention is directed to a specific facing material for use in connection with clutch plates of the general character described wherein the facing is longer wearing and has better torque characteristics than facings heretofore used. Specifically, our facing material is sheeted by conventional paper making techniques on a Fourdrinier or cylinder paper making machine. The sheeted material preferably has an average thickness in the order of .025–.075 inch. Although this figure may vary over wide limits in accordance with the intended use. The paper sheet resulting from the sheeting process is subsequently die cut to the desired facing shape and is then impregnated with a phenolic material in solution. Excess phenolic material is removed by centrifuging or whirling of the facing discs to leave a network of the fibers each coated over with the phenolic resin and bonded together therewith at their intersecting portions. The non-fibrous materials used in the sheet are held and dispersed therethrough and are bonded to the remainder of the sheet by the phenolic resin. In this instance, it is important that the facing have a degree of porosity therein to facilitate passage of the cooling fluid in the wet clutch application. In other words, this fluid passes through the facing within the pores thereof thereby aiding in cushioning the engagement of the clutch plates and aiding in the disengagement thereof while acting as a coolant.

A preferred composition for use in connecton with the Fourdrinier process for making the paper-like sheet is to use the following ingredients: second cut virgin cotton linters—50%, leather dust (commercial minus 90 mesh) —10%, asbestos fiber (#6D preferred)—10%, filler and absorbent (commercial fuller's earth)—15%, red iron oxide (synthetic preferred)—15%, all percentages by weight.

In the above recipe, all of the ingredients may be varied plus or minus 10% from the specified percentage and useful friction material will be produced for specific applications. However, variations not in excess of plus or minus 5% will generally yield material of substantially the same qualities. In place of the second cut cotton linters, any comminuted cotton stock processed or otherwise may be used although we prefer the second cut linters because of their cost. The comminuted cotton stocks referred to above are of the type generally used in the manufacture of paper. In place of fuller's earth, any of the usual inorganic fillers such as diatomaceous earth, infusorial earth, such as clay, may be used.

The synthetic red iron oxide is an important addition to the material as it adds frictional characteristics thereto. We have found that the synthetic iron oxide is preferred over natural iron oxide obtained from ores although any red iron oxide of high purity may be used if the siliceous material does not exceed 12% and the composition is within controlled limits. It should be of a size so that 95% passes a 325 mesh screen to permit smooth operation without galling.

Variations in the frictional characteristics of the material described may be obtained by adding thereto such ingredients as metal powders or flake, for example, copper, lead, copper lead, tin, etc., and such additions should be made in accordance with the characteristics desired in the final product.

The ingredients are processed and sheeted in a paper making machine to form the paper-like sheet which, after die cutting, is impregnated with a phenol formaldehyde resin composition. This composition may vary considerably although one highly successful material is made as follows:

*Formula #1*

47 parts phenol crylstals
51.5 parts formaldehyde sol. 35 to 40 pct. tec.
1.5 parts ammonium hydroxide 28 pct. sol.

The impregnation of the paper discs is accomplished by mixing equal parts of Formula #1 with isopropyl alcohol to yield a solution having about 20 to 25% solids content after evaporation. The impregnation of the paper rings is accomplished by placing the rings in this diluted solution for from 2 to 3 minutes, centrifugally spinning off excess resin and then drying in an oven at about 200° F. for about 30 minutes. The impregnated discs should be checked for spongy character since this is a requirement for ultimate satisfactory operation.

After the discs have been dried, they may be cemented to metal discs by means of a suitable adhesion cement. One of such cements can be made by utilizing the resin ingredient disclosed in Formula #1 and diluting same with propyl alcohol together with a small quantity of hexamethylene-tertamine. The cement may be reinforced with china clay, if desired. While this cement is entirely satisfactory, other phenol formaldehyde base cements which are commerically manufactured, for example phenol formaldehyde butadiene acrylonitrile copolymer cements, sold under the trade name of "Cycleweld" are also useful.

The cement is applied to the metal disc in a thickness of about .005 inch. It is predried to a tacky condition which may be accomplished by short exposure to infrared heaters or other similar equipment. The impregnated ring is then placed on the cement coated metal disc and mechanically pressed thereto to remove air bubbles and is thereafter baked for about 20 minutes at 300° F. in circulating air to accomplish the bonding operation. This bonding operation may be carried out in stacks or with slight pressure on the discs to accomplish a satisfactory bond or if the cement is first air dried, under slight pressure, the discs may be passed through a heating over in a continuous fashion all of such expedients being well known in the art. In all cases, it is understood that where pressures are used that these pressures are insufficient to destroy the spongy nature of the impregnated disc and in all cases the particular impregnating and bonding resins are important only so far as they will withstand the temperature of operation of the device and provide strong bonds between the non-metal friction discs and the metal supporting elements. As previously set forth, phenol formaldehyde base cements are highly satisfactory for these purposes. During the cure and bonding procedures a loss in thickness in the order of 20% will occur due to the thermo setting qualities of the impregnant.

While the embodiment of the present invention as herein disclosed constitutes a preferred form, it is to be understood that other forms might be adopted.

What is claimed is as follows:

1. A friction facing adapted to be coextensively attached to a strong metal backing, comprising in combination; a porous sheet of felted material, each fiber thereof being bonded together and coated over with a phenol formaldehyde base resin, said sheet including interconnecting pores therein, said porous sheet comprising a combination of comminuted cotton stock in quantities of from 45 to 55%, leather dust and asbestos, each in quantities of from 9 to 11%, together with an inorganic absorbent filler and red iron oxide each in quantities of from 13.5 to 16.5%.

2. A combination as claimed in claim 1 wherein the comminuted cotton stock is second cut cotton linters and the red iron oxide is synthetic red iron oxide.

3. A friction facing comprising sheeted material made from cotton stock in quantities of from 45 to 55% by weight, red iron oxide in quantities of from 13.5 to 16.5% by weight together with absorbent fillers and fibers making up the remainder, said material being bonded together with a phenol formaldehyde base resin wherein the resin coats each fiber and bonds adjacent fibers together at their intersecting parts while leaving a multiplicity of minute interconnecting pores through the sheet.

4. A friction facing adapted to be coextensively attached to a strong metal backing, comprising in combination; porous sheet material impregnated with a phenol formaldehyde base resin and including interconnecting pores therein, said porous sheet material consisting of second cut virgin cotton linters 50%, leather dust 10%, asbestos 10%, fuller's earth 15% and red iron oxide 15%.

5. A friction material adapted to be coextensively attached to a strong metal backing, comprising in combination; porous sheet material impregnated with a phenol formaldehyde base resin and including interconnecting pores therein, said sheet material consisting of 50% cotton linters, 10% leather dust, 10% asbestos fiber, 15% absorbent inorganic filler, and 15% red iron oxide, said ingredients being present in quantities of plus or minus 5% of the stated percentages.

References Cited in the file of this patent

UNITED STATES PATENTS

| | | |
|---|---|---|
| 1,639,611 | Nash | Aug. 16, 1927 |
| 2,110,571 | Elerath | Mar. 8, 1938 |
| 2,155,020 | Nanfeldt | Apr. 18, 1939 |
| 2,476,588 | Dreher | July 19, 1949 |
| 2,553,215 | Schultz | May 15, 1951 |